United States Patent
Tung

(10) Patent No.: US 7,658,013 B2
(45) Date of Patent: Feb. 9, 2010

(54) SUPPORT ASSEMBLY FOR A COUNTER WEIGHT OF A LASER LEVEL

(75) Inventor: Hsin-Chih Tung, Chung Li (TW)

(73) Assignee: LECC Technology Co., Ltd., Tao Yuan Hsien (TW)

( * ) Notice: Subject to any disclaimer, the term of this patent is extended or adjusted under 35 U.S.C. 154(b) by 0 days.

(21) Appl. No.: 12/222,858

(22) Filed: Aug. 19, 2008

(65) Prior Publication Data

US 2009/0106991 A1   Apr. 30, 2009

(30) Foreign Application Priority Data

Oct. 24, 2007   (TW) ............................... 96139877 A

(51) Int. Cl.
  *G01C 15/01* (2006.01)
(52) U.S. Cl. .......................................... 33/286; 33/290
(58) Field of Classification Search ................. 33/286, 33/285, 281–283, DIG. 21, 290
  See application file for complete search history.

(56) References Cited

U.S. PATENT DOCUMENTS 5,782,003 A * 7/1998 Bozzo .......................... 33/291
6,009,630 A * 1/2000 Rando .......................... 33/291
6,722,048 B2 * 4/2004 Huang et al. .................. 33/286
7,513,052 B2 * 4/2009 Milligan et al. ............... 33/290
2007/0204474 A1* 9/2007 Lin .............................. 33/286
2008/0235963 A1* 10/2008 Huang ........................... 33/291

FOREIGN PATENT DOCUMENTS

TW          M288683         3/2006

* cited by examiner

*Primary Examiner*—Yaritza Guadalupe-McCall
(74) *Attorney, Agent, or Firm*—Rosenberg, Klein & Lee

(57) ABSTRACT

A support assembly for a counter weight of a laser level is disposed in a main body of the laser level for supporting the counter weight with a laser module mounted therein in the main body. The support assembly includes a fixing unit and a universal bearing. The fixing unit is disposed in the main body and the universal bearing is mounted in the fixing unit. The counter weight has a shaft portion formed on an upper end thereof and connected with the universal bearing. The counter weight is swingingly supported in the main body by the universal bearing. Basing on the structure, the present invention has a simple structure for easy assembly and disassembly, thereby being manufactured, maintained and corrected conveniently.

7 Claims, 4 Drawing Sheets

SUPPORT ASSEMBLY FOR A COUNTER WEIGHT OF A LASER LEVEL

BACKGROUND OF THE INVENTION

1. Field of the Invention

The present invention relates to a support assembly for a counter weight of a laser level, and more especially to a support assembly for a counter weight which can improve supporting ways for counter weights of laser levels and have a simple structure for easy assembly and disassembly, thereby being manufactured, maintained and corrected conveniently.

2. Description of Related Art

Each conventional counter weight type laser level always has a counter weight in which at least one laser module (or called laser transmitter) is disposed. The counter weight is supported in the main body by a support assembly, so that the counter weight can swing back and forth and right and left, as disclosed in Taiwan Patent Certificate No. M288683.

The support assembly described above generally includes a main support ring, an auxiliary support ring, two first support shafts, two second support shafts and four bearings. An upper end of the counter weight is supported on the auxiliary support ring by the two first support shafts and two bearings so that the counter weight swings right and left around the axis of the first support shaft. Then the auxiliary support ring is supported on the main support ring by the two second support shafts and two bearings so that the counter weight swings back and forth around the axis of the second support shaft. Accordingly, the counter weight which is pivotingly disposed in the main body and swings back and forth and right and left, can perform rotation motion in at least two axial directions relatively to the main body, so that a plumb line is defined along the gravity direction by the center of gravity of the counter weight.

However, the conventional support assembly for a counter weight of a laser level at least includes the main support ring, the auxiliary support ring, the two first support shafts, the two second support shafts and the four bearings. The number of the components is so large that the support assembly has a complex structure and is difficult to be assembled and disassembled. Especially, it needs high accuracy to assemble the bearings and the support shafts, and one little mistake may cause the deviation of the bearings and the support shafts so that the laser level cannot operate normally. Obviously, the design is inconvenient for manufacture and maintenance, especially, the laser level needs to be sent back to its original factory to be corrected after leaving the factory, which also causes the operation inconvenience.

Hence, the inventors of the present invention believe that the shortcomings described above are able to be improved and finally suggest the present invention which is of a reasonable design and is an effective improvement.

SUMMARY OF THE INVENTION

A main object of the present invention is to provide a support assembly for a counter weight of a laser level which has a simple structure for easy assembly and disassembly, thereby being manufactured, maintained and corrected conveniently.

To achieve the above-mentioned object, a support assembly for a counter weight of a laser level in accordance with the present invention is provided. The support assembly is disposed in a main body of the laser level for supporting the counter weight with a laser module mounted therein in the main body. The support assembly includes: a fixing unit disposed in the main body; and a universal bearing mounted in the fixing unit; wherein the counter weight has a shaft portion formed on an upper end thereof and connected with the universal bearing, and the counter weight is supported by the universal bearing such that it can swing in the main body.

The efficacy of the present invention is as follows: the support assembly of the present invention supports the counter weight such that it can swing in the main body via the universal bearing and has fewer components, so it has a simple structure for easy assembly and disassembly and the difficulty of the assembly is reduced, and further, the deviation of conventional bearings and support shafts can be avoided. The design of the present invention is favorable to manufacture, maintenance and correction.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

Figure 1:
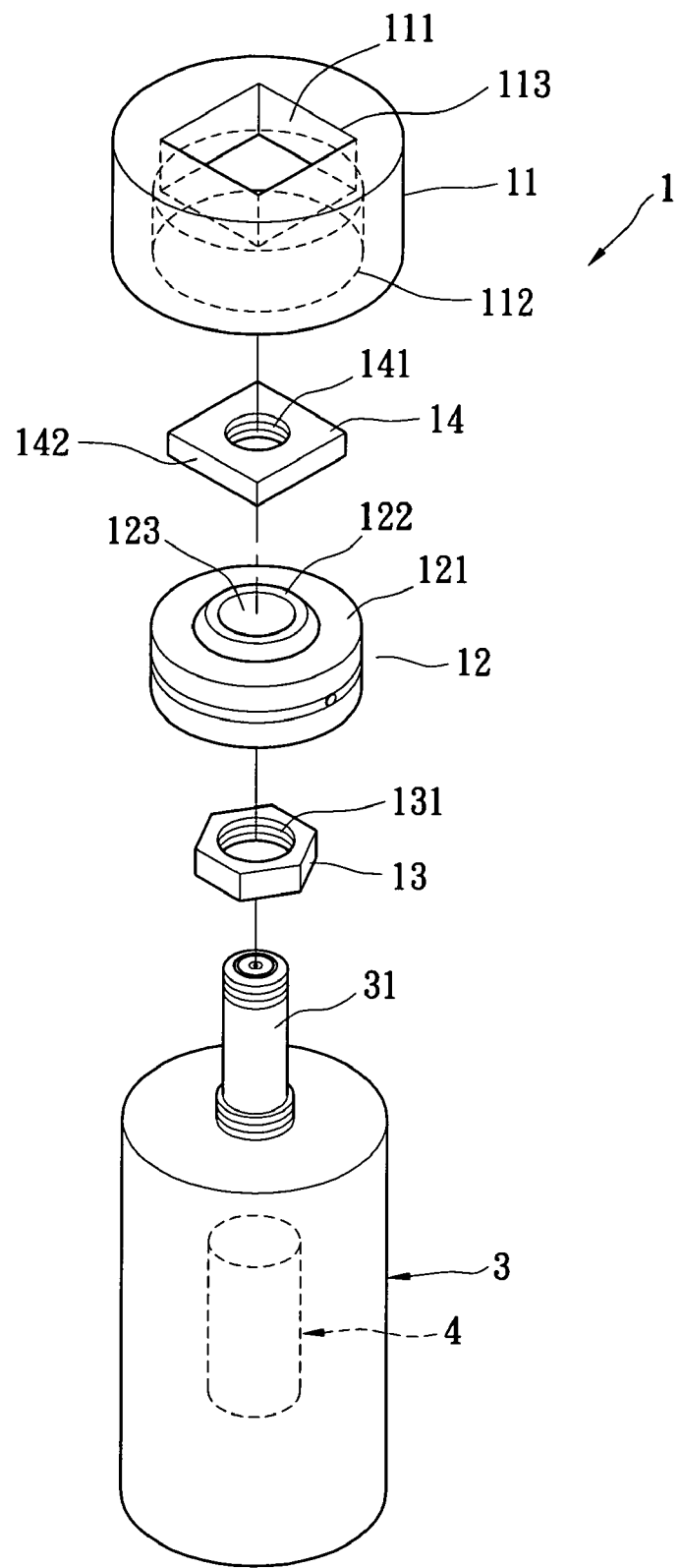
FIG. 1 is an exploded perspective view of the present invention.
Figure 2:
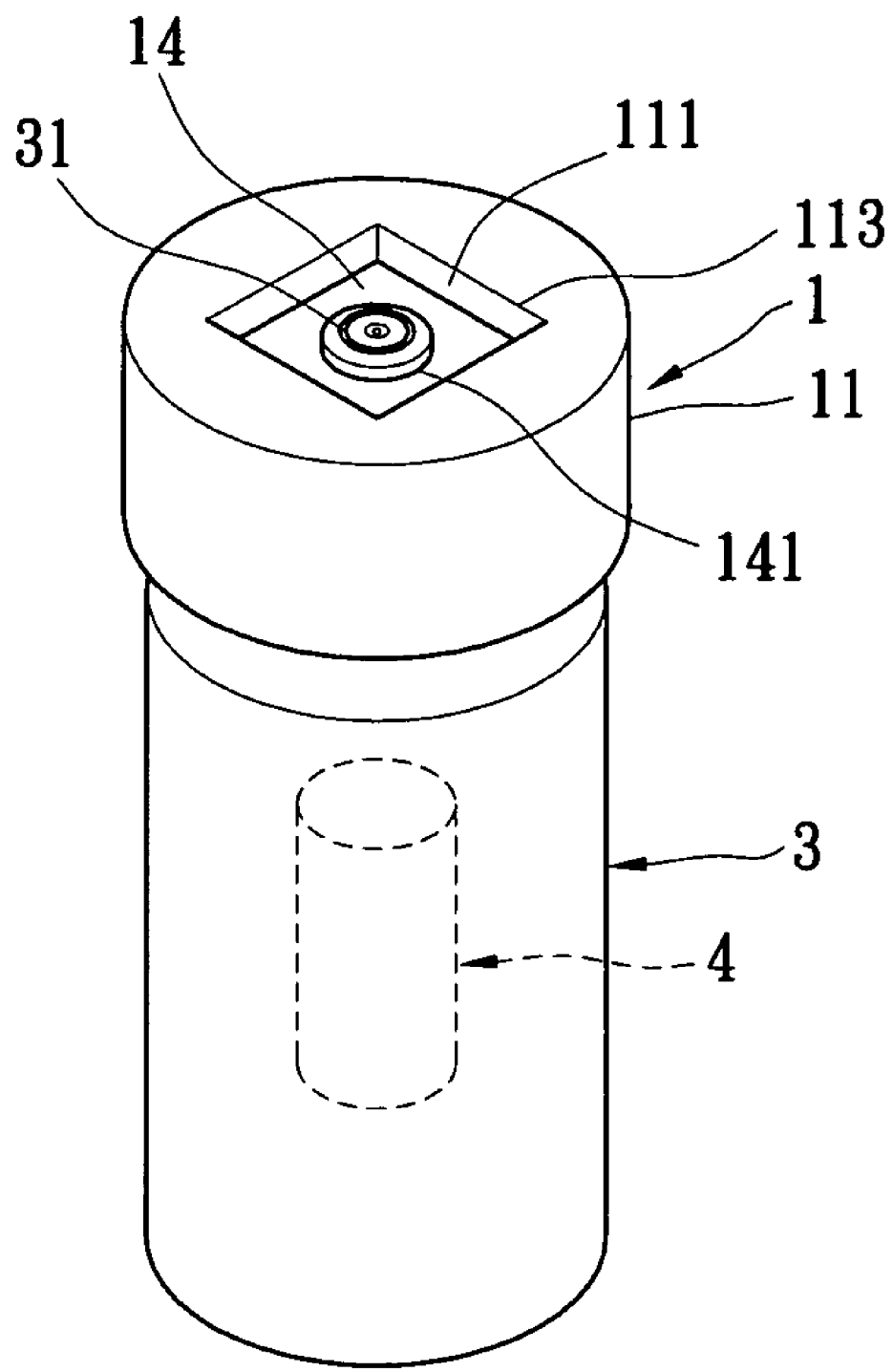
FIG. 2 is a perspective view of the present invention.
Figure 3:
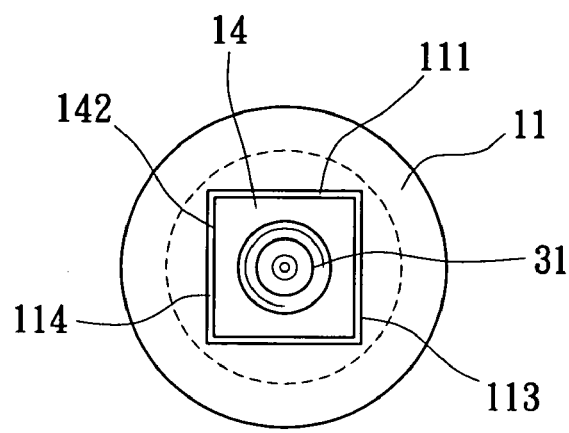
FIG. 3 is a top view of the present invention.
Figure 4:
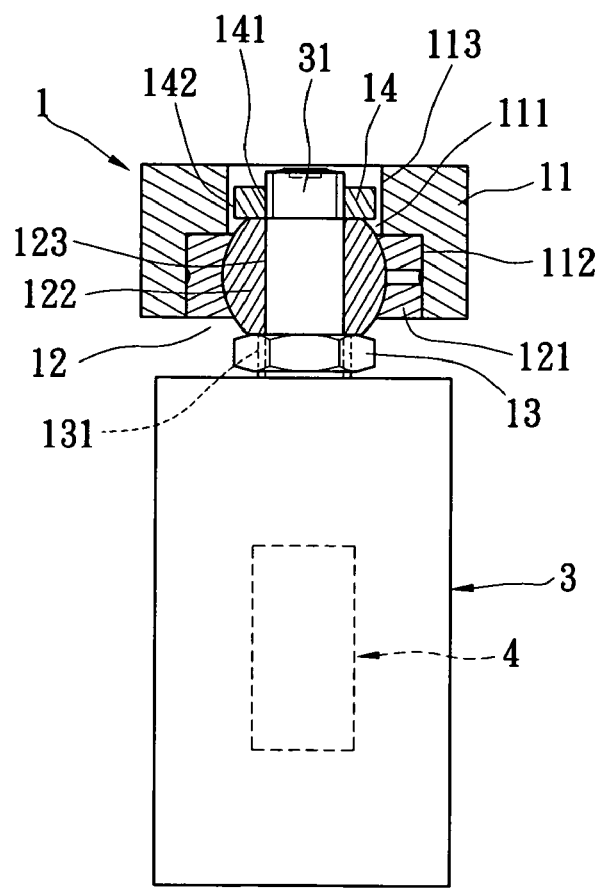
FIG. 4 is a cross-sectional view of the present invention.
Figure 5:
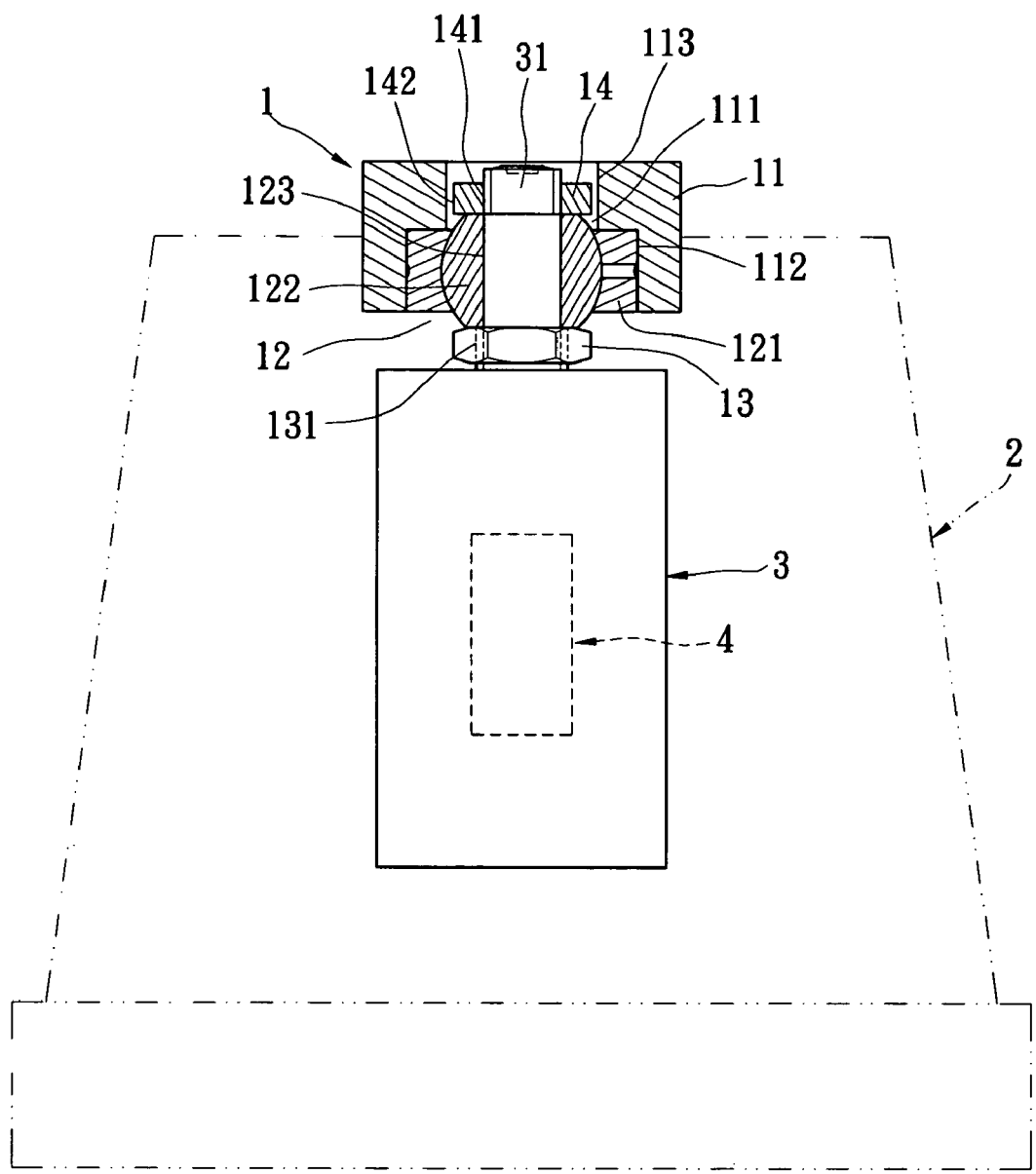
FIG. 5 is a schematic view of the support assembly of the present invention disposed in a main body of a laser level.

Please refer to FIGS. 1-4, the present invention provides a support assembly for a counter weight of a laser level. The support assembly 1 is disposed in the main body 2 of a laser level (as shown in FIG. 5) for supporting a counter weight 3 in the main body 2 so that the counter weight 3 can swing back and forth and right and left. The counter weight 3 is hollow and at least one laser module 4 is mounted in the counter weight 3. The laser module 4 may emit laser beams upwards, downwards or toward sides. Proper imaging lenses or spectroscopes (not shown) are disposed in front of the laser module 4, wherein the imaging lenses are columnar lens or wave-surface lenses etc. The laser beams from the laser module 4 form linear structures after passing through the imaging lenses, whereby horizontal or vertical line-shaped standard lines are emitted. Since the counter weight 3 and the laser module 4 described above have the structures generally similar to those of conventional counter weights and laser modules and aren't within the scope of the present invention, they are omitted in the present invention.

The support assembly 1 includes a fixing unit 11 and a universal bearing 12. The fixing unit 11 has a limiting hole 111 and a fixing hole 112 formed in the center thereof, which extend through a top surface and a bottom surface of the fixing unit 11. The limiting hole 111 is a square hole which is located over the fixing hole 112 and each of the four sides of the square hole forms a first limiting surface 113. The fixing unit 11 is fixedly disposed in the main body 2.

The universal bearing 12 includes a ball bearing seat 121 and a ball body 122 pivotingly disposed in the ball bearing seat 121. The ball body 122 may universally rotate in the ball bearing seat 121. A mounting hole 123 passes through the center of the ball body 122 for assembly of the counter weight 3. The ball bearing seat 121 of the universal bearing 12 is embedded and fixed in the fixing hole 112 of the fixing unit 11, so that the universal bearing 12 can be mounted in the main body 2.

The present invention may further have a support element 13 and a limiting element 14 which respectively have a through-hole 131 and a through-hole 141 formed in the centers thereof. The limiting element 14 is a square body of which side length is slightly smaller than that of the limiting hole 111. Each of the four sides of the limiting element 14 forms a second limiting surface 142.

A shaft portion 31 with a small outside diameter is formed on an upper end of the counter weight 3. The support element 13 is fixed close to the lower end of the shaft portion 31 of the counter weight 3 via a tight fit or a bolt joint. Then the shaft portion 31 of the counter weight 3 is inserted in the mounting hole 123 of the ball body 122 of the universal bearing 12, and the bottom of the ball body 122 of the universal bearing 12 abuts against the top of the support element 13 and the upper end of the shaft portion 31 extends out of the top of the ball body 122 of the universal bearing 12. The limiting element 14 is fixed close to the upper end of the shaft portion 31 of the counter weight 3 via a tight fit or a bolt joint and the limiting element 14 is received in the limiting hole 111, wherein the second limiting surfaces 142 of the four sides of the limiting element 14 and the first limiting surfaces 113 of the four sides of the limiting hole 111 define an interval 114 therebetween for providing a swing space for the shaft portion 31 of the counter weight 3. Also, the first limiting surfaces 113 and the second limiting surfaces 142 compose a limiting mechanism between the fixing unit 11 and the universal bearing 12 to limit the back and forth and right and left swing of the counter weight 3. Accordingly, the counter weight 3 is supported on the fixing unit 11 by the universal bearing 12 so that it can swing and pivot in the main body 2 and perform rotational motion in at least two directions relative to the main body 2. Thereby a plumb line is defined along the gravity direction by the center of gravity of the counter weight 3. Based on the above, structure, the support assembly for a counter weight of a laser level is configured in accordance with the present invention.

The support assembly 1 of the present invention supports the counter weight 3 via the universal bearing 12 such that it can swing in the main body 2. The support assembly has fewer components so it has a simple structure for easy assembly and disassembly; especially, conventional bearings and support shafts are omitted thereby the assembly is easy to be achieved and the deviation of the bearings and the support shafts can be avoided. Obviously, the design of the present invention is favorable to manufacture, maintenance and correction.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A support assembly for a counter weight of a laser level which is disposed in a main body of the laser level for supporting the counter weight with a laser module mounted therein in the main body, comprising:
a fixing unit disposed in the main body;
a universal bearing mounted in the fixing unit, the counter weight having a shaft portion formed on an upper end thereof and connected with the universal bearing, and the counter weight being supported by the universal bearing such that it can swing in the main body and
a limiting mechanism disposed between the fixing unit and the universal bearing, a limiting hole which is a square hole being formed in the fixing unit, and each of the four sides of the limiting hole forming a first limiting surface; a limiting element, which is a square body, is fixed on the shaft portion of the counter weight and received in the limiting hole, and each of four sides of the limiting element forming a second limiting surface; and the first limiting surfaces and the second limiting surfaces define an interval therebetween and compose the limiting mechanism.

2. The support assembly for a counter weight of a laser level as claimed in claim 1, wherein the limiting element has a through-hole fixed on the shaft portion of the counter weight.

3. The support assembly for a counter weight of a laser level as claimed in claim 1, wherein the fixing unit has a fixing hole over which the limiting hole is located and the universal bearing is fixed in the fixing hole.

4. A support assembly for a counter weight of a laser level which is disposed in a main body of the laser level for supporting the counter weight with a laser module mounted therein in the main body, comprising:
a fixing unit disposed in the main body; and
a universal bearing mounted in the fixing unit, the counter weight having a shaft portion formed on an upper end thereof and connected with the universal bearing, and the counter weight being supported by the universal bearing such that it can swing in the main body, the universal bearing including a ball bearing seat fixed in the fixing unit and a ball body pivotally disposed in the ball bearing seat, and the ball body has a mounting hole passing through its center and the shaft portion of the counter weight is inserted in the mounting hole of the ball body.

5. The support assembly for a counter weight of a laser level as claimed in claim 4, wherein a support element is fixed on the shaft portion of the counter weight close to a lower end of the shaft portion, and the ball body of the universal bearing abuts against the support element.

6. A support assembly for a counter weight of a laser level which is disposed in a main body of the laser level for supporting the counter weight with a laser module mounted therein in the main body, comprising:
a fixing unit disposed in the main body; and
a universal bearing mounted in the fixing unit, the counter weight having a shaft portion formed on an upper end thereof and connected with the universal bearing, and the counter weight being supported by the universal bearing such that it can swing in the main body, the universal bearing includes a ball bearing seat fixed in the fixing unit and a ball body pivotally disposed in the ball bearing seat, and the ball body has a mounting hole extending through a center thereof and the shaft portion of the counter weight is inserted in the mounting hole of the ball body, and a limiting mechanism is disposed between the fixing unit and the universal bearing.

7. The support assembly for a counter weight of a laser level as claimed in claim 6, wherein a support element is fixed on the shaft portion and has a through-hole which is fixed close to a lower end of the shaft portion of the counter weight, and the ball body of the universal bearing abuts against the support element.

* * * * *